(12) United States Patent
Kim

(10) Patent No.: US 11,358,630 B2
(45) Date of Patent: Jun. 14, 2022

(54) ELECTRIC STEERING APPARATUS FOR VEHICLE AND METHOD FOR CONTROLLING THE SAME

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 204 days.

(21) Appl. No.: 16/916,850

(22) Filed: Jun. 30, 2020

(65) Prior Publication Data
US 2021/0009194 A1 Jan. 14, 2021

(30) Foreign Application Priority Data
Jul. 10, 2019 (KR) .................. 10-2019-0082974

(51) Int. Cl.
*B62D 6/00* (2006.01)
*B62D 1/16* (2006.01)
*B62D 5/04* (2006.01)

(52) U.S. Cl.
CPC ............. *B62D 5/0481* (2013.01); *B62D 1/16* (2013.01); *B62D 6/00* (2013.01)

(58) Field of Classification Search
CPC .......... B62D 5/0481; B62D 1/16; B62D 6/00
See application file for complete search history.

(56) References Cited

FOREIGN PATENT DOCUMENTS

KR 10-2017-0065793 A 6/2017

*Primary Examiner* — Mathew Franklin Gordon
(74) *Attorney, Agent, or Firm* — NSIP Law

(57) ABSTRACT

An electric steering apparatus may include: a column torque sensor configured to detect column torque; a vehicle speed sensor configured to detect vehicle speed of the vehicle; an autonomous driving control unit configured to determine a second command current in an autonomous driving mode; a driver steering intervention determination unit configured to determine whether a driver intervenes in steering; an MDPS logic unit configured to determine a first command current based on the column torque and the vehicle speed, when the driver's steering intervention occurs in the autonomous driving mode; and an output control unit configured to determine a final weight based on a steering angular velocity and the column torque, when the driver's steering intervention occurs in the autonomous driving mode, and determine a final command current by applying the determined final weight to the first and second command currents.

14 Claims, 5 Drawing Sheets

ELECTRIC STEERING APPARATUS FOR VEHICLE AND METHOD FOR CONTROLLING THE SAME

CROSS-REFERENCE TO RELATED APPLICATION

This application claims priority from and the benefit of Korean Patent Application No. 10-2019-0082974, filed on Jul. 10, 2019, which is hereby incorporated by reference for all purposes as if set forth herein.

BACKGROUND

Field

Exemplary embodiments of the present disclosure relate to an electric steering apparatus for a vehicle and a method for controlling the same, and more particularly, to an electric steering apparatus for a vehicle, which can give a steering authority to a driver when the driver needs to intervene in steering in an autonomous driving mode of a vehicle, and maintain autonomous driving when the driver releases a steering wheel, and a method for controlling the same.

Discussion of the Background

A power steering for a vehicle refers to a steering apparatus using power, and serves to help a driver to operate a steering wheel. Such a power steering has mainly used hydraulic pressure. Recently, however, the use of an MDPS (Motor Driven Power Steering) system which uses the force of a motor has increased. The MDPS system has advantages in that it has a smaller weight and occupies a smaller space than the existing hydraulic power steering system, and does not need to exchange oil.

The MDPS system determines a traveling condition of a vehicle through a torque sensor for measuring a driver's steering torque inputted to a steering wheel, a steering angle sensor for measuring a steering angle or steering angular velocity of the steering wheel, and a vehicle speed sensor for measuring vehicle speed. As the driver operates the steering wheel, the MDPS system provides assist torque through an electric motor based on steering torque applied to a steering shaft.

An autonomous vehicle recognizes the environment of the road on which the autonomous vehicle is traveling, through autonomous driving modules (camera sensor, radar sensor, lidar sensor and the like) in an autonomous driving mode, and determines a command steering angle and command torque required for an operation of an MDPS system applied to the autonomous vehicle, in order to control the operation of the MDPS system.

At this time, when the autonomous driving system abnormally operates, for example, when a sudden breakdown occurs in the autonomous driving modules, a driver holds the steering wheel and operates the steering wheel according to his/her intention, in order to control the traveling of the vehicle.

In the related art, however, when the driver wants to turn off autonomous driving in the autonomous driving mode of the vehicle, the driver needs to operate an autonomous driving on/off switch. Furthermore, although the autonomous vehicle recognizes the driver's steering intervention in the autonomous driving mode of the vehicle and turns off the autonomous driving, the autonomous driving is not maintained when the driver releases the steering wheel again. In this case, the convenience and safety of the driver may be degraded.

Therefore, there is a demand for the development of a technique which can give a steering authority to a driver when the driver's steering intervention is needed in the autonomous driving mode of the vehicle, and maintain autonomous driving again when the driver releases the steering wheel.

The related art of the present disclosure is disclosed in Korean Patent Application 10-2017-0065793 published on Jun. 14, 2017.

SUMMARY

Various embodiments are directed to an electric steering apparatus for a vehicle, which can give a steering authority to a driver when the driver needs to intervene in steering in an autonomous driving mode of a vehicle, and maintain autonomous driving when the driver releases a steering wheel, and a method for controlling the same.

In an embodiment, an electric steering apparatus for a vehicle may include: a column torque sensor configured to detect column torque applied to a steering column of a vehicle; a vehicle speed sensor configured to detect vehicle speed of the vehicle; an autonomous driving control unit configured to determine a second command current for driving an MDPS (Motor Driven Power Steering) motor in an autonomous driving mode of the vehicle; a driver steering intervention determination unit configured to determine whether a driver intervenes in steering, by monitoring column torque of the column torque sensor, in the autonomous driving mode of the vehicle; an MDPS logic unit configured to determine a first command current based on the column torque and the vehicle speed which are detected by the column torque sensor and the vehicle speed sensor, respectively, when the driver's steering intervention occurs in the autonomous driving mode of the vehicle; and an output control unit configured to determine a final weight based on a steering angular velocity and the column torque detected by the column torque sensor, when the driver's steering intervention occurs in the autonomous driving mode of the vehicle, and determine a final command current by applying the determined final weight to the first and second command currents.

The driver steering intervention determination unit may determine that the driver intervenes in steering, when the state in which the magnitude of the column torque is equal to or more than a preset reference value is maintained for a preset reference time or more.

The driver steering intervention determination unit may perform low pass filtering on the column torque, and then determine whether the driver intervenes in steering, based on the column torque subjected to the low pass filtering.

The output control unit may adjust the magnitude of the final command current through an exponential smoothing filter.

The output control unit may include: a weight determination unit configured to determine the final weight by multiplying a first weight corresponding to the column torque by a second weight corresponding to the steering angular velocity; and a final output determination unit configured to determine the final command current by applying the final weight to the first command current and applying a value, obtained by subtracting the final weight from '1', to the second command current.

The weight determination unit may acquire a first weight corresponding to the column torque from a column torque weight table in which a weight is matched with each column torque, and acquire a second weight corresponding to the steering angular velocity from a steering angular velocity weight table in which a weight is matched with each steering angular velocity.

After determining the final command current by applying the final weight to the first and second command currents, the output control unit may turn off the autonomous driving mode when the state in which the magnitude of the column torque is equal to or more than the preset reference value is maintained for a preset reference time or more.

In an embodiment, a method for controlling an electric steering apparatus for a vehicle may include: determining, by an autonomous driving control unit, a second command current for driving an MDPS motor in an autonomous driving mode of a vehicle, and driving the MDPS motor; determining, by a driver steering intervention determination unit, whether a driver intervenes in steering, by monitoring column torque applied to a steering column of the vehicle in the autonomous driving mode of the vehicle; determining, by an MDPS logic unit, a first command current based on the column torque and the vehicle speed of the vehicle, when the driver's steering intervention occurs in the autonomous driving mode of the vehicle; and determining, by an output control unit, a final weight based on the column torque and a steering angular velocity, when the driver's steering intervention occurs in the autonomous driving mode of the vehicle, and determining a final command current by applying the determined final weight to the first and second command currents.

In the determining of whether the driver intervenes in steering, the driver steering intervention determination unit may determine that the driver intervenes in steering, when the state in which the magnitude of the column torque is equal to or more than a preset reference value is maintained for a preset reference time or more.

In the determining of whether the driver intervenes in steering, the driver steering intervention determination unit may perform low pass filtering on the column torque, and then determines whether the driver intervenes in steering, based on the column torque subjected to low pass filtering.

In the determining of the final command current, the output control unit may adjust the magnitude of the final command current through an exponential smoothing filter.

The determining of the final command current may include: determining, by the output control unit, the final weight by multiplying a first weight corresponding to the column torque by a second weight corresponding to the steering angular velocity; and determining, by the output control unit, the final command current by applying the final weight to the first command current and applying a value, obtained by subtracting the final weight from '1', to the second command current.

In the determining of the final weight, the output control unit may acquire the first weight corresponding to the column torque from a column torque weight table in which a weight is matched with each column torque, and acquire the second weight corresponding to the steering angular velocity from a steering angular velocity weight table in which a weight is matched with each steering angular velocity.

The method may further include turning off the autonomous driving mode when the state in which the magnitude of the column torque is equal to or more than the preset reference value is maintained for the preset reference time or more, after the determining of the final command current.

In accordance with the embodiments of the present disclosure, the electric steering apparatus for a vehicle and the method for controlling the same may accurately detect the case in which a driver rapidly turns off the autonomous driving mode of the vehicle and drives the vehicle in person because the driver does not momentarily want autonomous driving in the autonomous driving mode, or the case in which the driver's steering intervention is required for avoiding an obstacle due to a momentary error of the autonomous driving system. In this case, the electric steering apparatus and the method may give the steering authority to the driver, and then maintain the autonomous driving again when the driver releases the steering wheel. Therefore, the autonomous driving mode may smoothly transition depending on a situation, which makes it possible to maximize the convenience and safety of the driver.

When the driver performs steering while the autonomous driving mode is continuously turned on, the electric steering apparatus for a vehicle and the method for controlling the same may restrict the output of the autonomous driving, in order to turn off the autonomous driving while the driver performs steering, and to automatically maintain the autonomous driving when the driver does not hold the steering wheel again. Therefore, the electric steering apparatus and the method can raise the convenience of the driver, and compensate for a driver's carelessness or an error of the autonomous driving, thereby increasing the stability.

DETAILED DESCRIPTION OF THE ILLUSTRATED EMBODIMENTS

Figure 1:
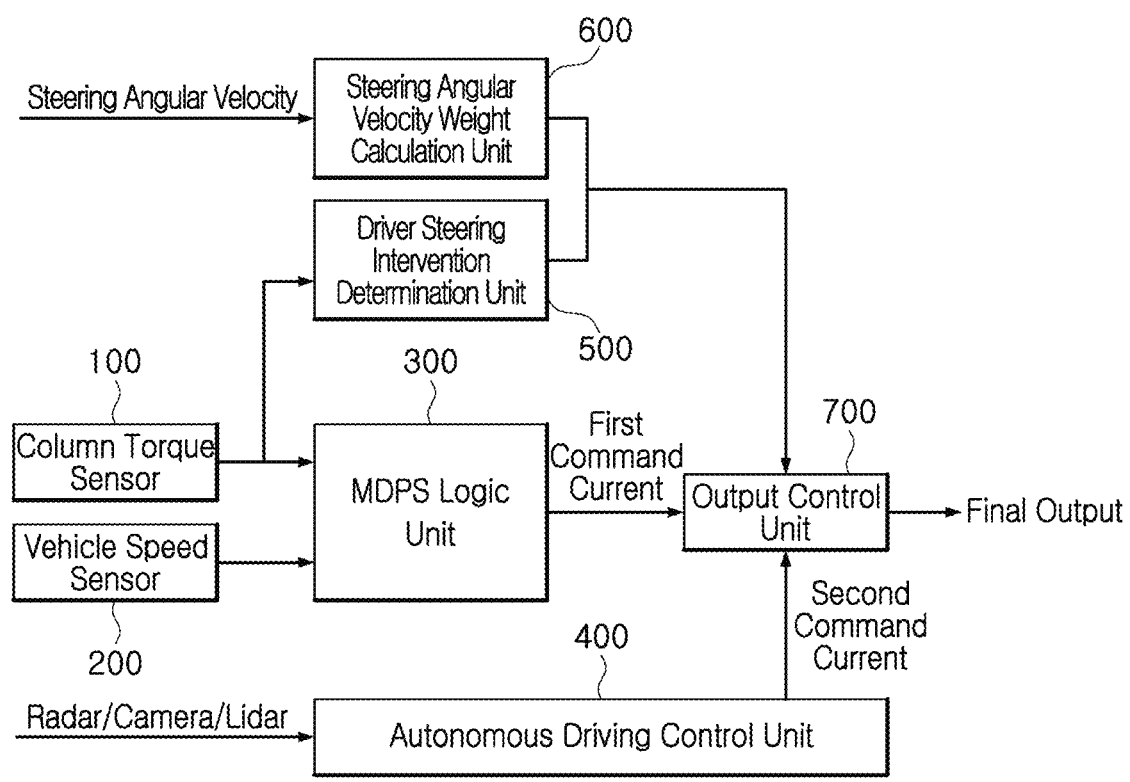
FIG. 1 is a block diagram illustrating an electric steering apparatus for a vehicle in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an electric steering apparatus for vehicle and a method for controlling the same will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Furthermore, the embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor includes a communication device, such as a computer, a cell phone, a PDA (Personal Digital Assistant) and another device, which can facilitate information communication between end users.

Figure 2:
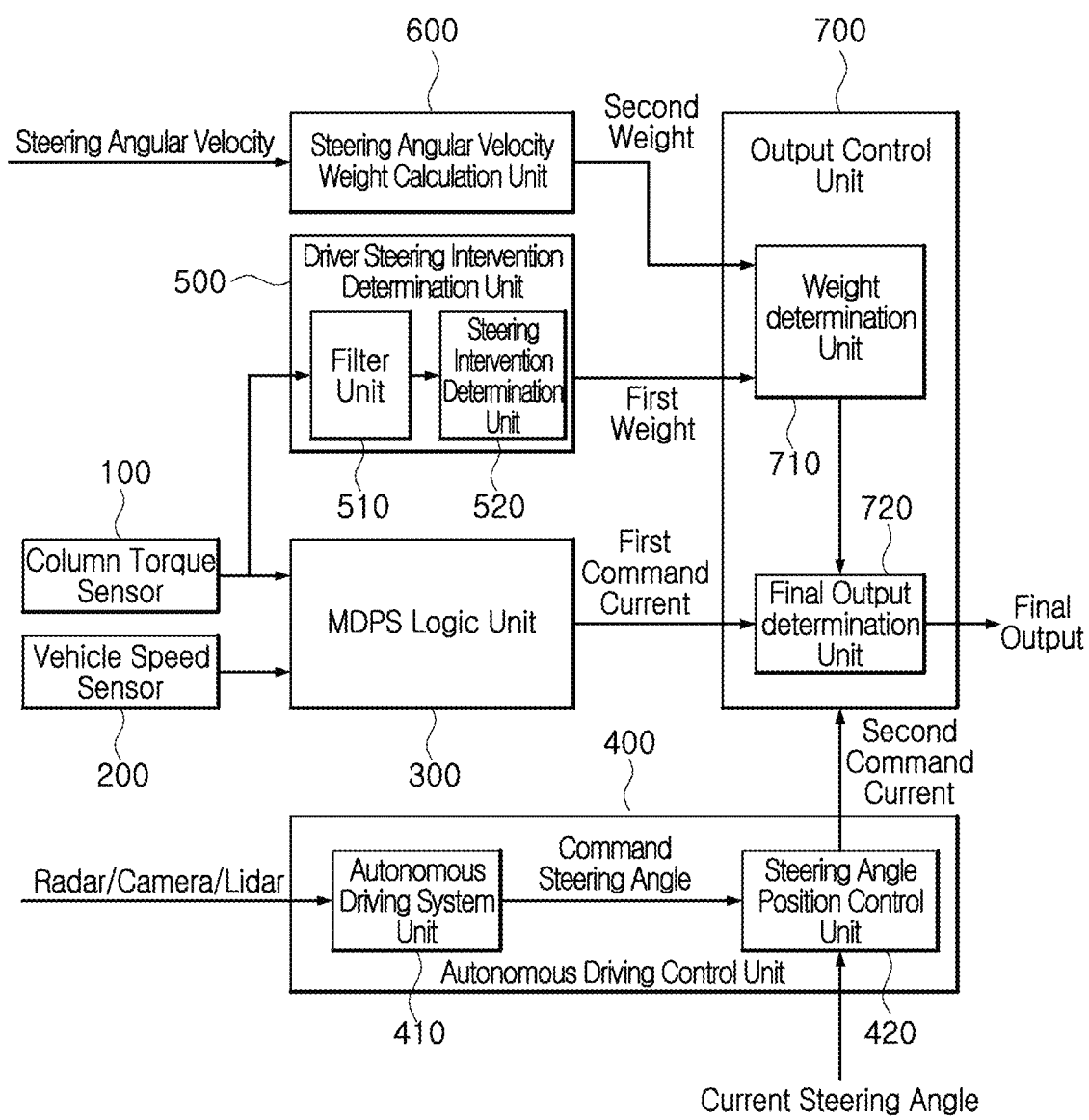
FIG. 2 is a block diagram illustrating the electric steering apparatus of FIG. 1 in detail.
Figure 3A:
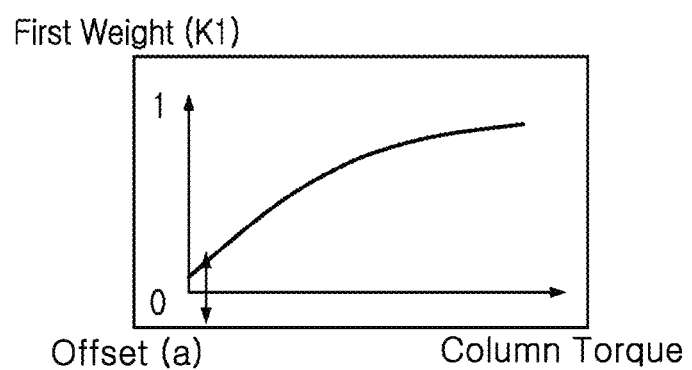
FIGS. 3A and 3B are diagrams for describing a first weight and a second weight in accordance with the embodiment of the present disclosure.
Figure 3B:
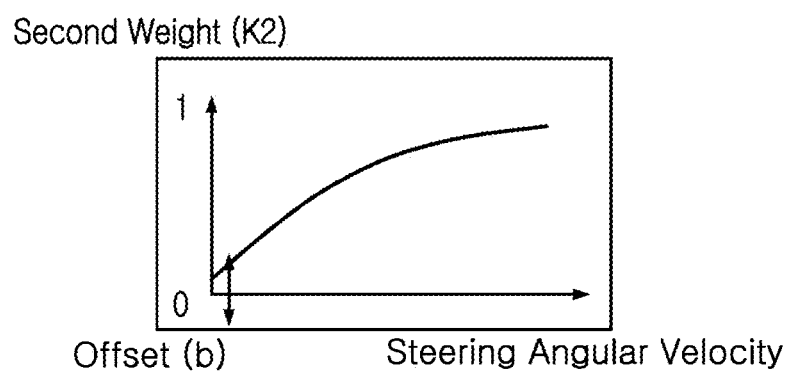

FIG. 1 is a block diagram illustrating an electric steering apparatus for a vehicle in accordance with an embodiment of the present disclosure, FIG. 2 is a block diagram illustrating the electric steering apparatus of FIG. 1 in detail, and FIGS. 3A and 3B are diagrams for describing a first weight and a second weight in accordance with the embodiment of the present disclosure.

Referring to FIGS. 1 and 2, the electric steering apparatus in accordance with the embodiment of the present disclosure may include a column torque sensor 100, a vehicle speed sensor 200, an MDPS logic unit 300, an autonomous driving control unit 400, a driver steering intervention determination unit 500, a steering angular velocity weight calculation unit 600 and an output control unit 700.

The column torque sensor 100 may detect column torque applied to a steering column of the vehicle, and transfer the detected column torque to the MDPS logic unit 300 and the driver steering intervention determination unit 500, which will be described below. The column torque applied to the steering column may include not only column torque applied by a driver, but also column torque caused by a lateral force applied to a vehicle due to the state of the road and the traveling environment.

The vehicle speed sensor 200 may detect the speed of the vehicle in operation. The vehicle speed sensor 200 may include various sensors such as a sensor for detecting vehicle speed using the rotation speed of a wheel, a sensor for detecting vehicle speed by measuring an engine RPM (Revolution Per Minute), and a sensor for detecting vehicle speed using the GPS (Global Positioning System).

The steering angle sensor (not illustrated) senses a steering angle and steering angular velocity of a steering wheel. That is, the steering angle sensor 20 includes an optical sensor to sense a steering angle, and detects a steering angular velocity by differentiating the steering angle with respect to time.

The MDPS logic unit 300 may determine a first command current for driving an MDPS motor (not illustrated) in a manual driving mode of the driver, based on the column torque and the vehicle speed which are detected by the column torque sensor 100 and the vehicle speed sensor 200, respectively. The MDPS logic unit 300 may determine the first command current for driving the MDPS motor in the manual driving mode by applying a boost curve to the column torque and the vehicle speed.

The MDPS logic unit 300 calculates the first command current based on column torque generated by torsion of a torsion bar according to the driver's steering intention, and controls the MDPS motor to provide an assist output, when the current driving mode is not the autonomous driving mode.

The autonomous driving control unit 400 determines a second command current for driving the MDPS motor in the autonomous driving mode of the vehicle.

For this operation, the autonomous driving control unit 400 includes an autonomous driving system unit 410 and a steering angle position control unit 420.

The autonomous driving system unit 410 generates a command steering angle through the traveling environment of the vehicle, detected by the autonomous driving modules (not illustrated) mounted in the vehicle (for example, a camera sensor, a radar sensor, a lidar sensor and the like). That is, the autonomous driving system unit 410 recognizes a lane or obstacle through a radar or camera, follows a path, and generates the command steering angle, in order to perform autonomous driving.

The steering angle position control unit 420 determines the second command current for driving the MDPS motor in the autonomous driving mode, based on the command steering angle determined by the autonomous driving system unit 410, the vehicle speed detected by the vehicle speed sensor 200, and the current steering angle of the vehicle from a steering angle sensor (not illustrated). That is, the steering angle position control unit 420 receives the command steering angle generated by the autonomous driving system unit 410, and controls the MDPS motor to perform a steering operation for a desired position.

The driver steering intervention determination unit 500 determines whether the driver intervenes in steering.

That is, the driver steering intervention determination unit 500 may determine whether the driver intervenes in steering, by monitoring the column torque detected by the column torque sensor 100 in the autonomous driving mode of the vehicle. At this time, the driver steering intervention determination unit 500 may determine that the driver intervenes in steering, when the state in which the magnitude of column torque is equal to or more than a preset reference value is maintained for a preset reference time or more. When the column torque is generated at a predetermined level or more, it indicates that the torsion bar is distorted. In other words, it indicates that a target steering angle during autonomous driving is different from a target steering angle of the driver. However, the autonomous driving may be unintentionally turned off by a momentary torque fluctuation depending on the condition of the road. Thus, when the column torque is equal to or more than the predetermined reference value for a predetermine time or more, the driver steering intervention determination unit 500 may determine that the driver intervenes in steering.

As described above, the driver steering intervention determination unit 500 may determine whether the driver intervenes in steering, by monitoring the column torque. However, the autonomous driving may be turned off according to a column torque fluctuation caused by vibration of the road. Therefore, the driver steering intervention determination unit 500 needs to prevent the case in which the autonomous driving is turned off according to a column torque fluctuation caused by the vibration of the road.

Thus, the driver steering intervention determination unit 500 may apply LPF (Low Pass Filtering) to filter out only column torque within a frequency at which the driver steers, when determining whether the driver intervenes in steering. For example, since the driver cannot generally steer at a frequency of 4 Hz or more, the driver steering intervention determination unit 500 may filter out only signals within the frequency, thereby fundamentally blocking a torque fluctuation which occurs according to the vibration of the road. Therefore, the driver steering intervention determination unit 500 may perform LPF to filter out column torque within the frequency at which the driver steers, and determine whether the driver intervenes in steering, using the column torque filtered through LPF.

The driver steering intervention determination unit 500 may include a filter unit 510 and a steering intervention determination unit 520.

The filter unit 510 may perform noise filtering, on the column torque detected by the column torque sensor 100, through LPF. That is, the column torque detected by the column torque sensor 100 may include high-frequency noise depending on a road state (for example, a pothole or foreign matters on the road) with the column torque caused by the driver. Such high-frequency noise is reflected when the steering intervention determination unit 520 determines whether the driver intervenes in steering. Therefore, the filter unit 510 may remove high-frequency noise through LPF to filter out only necessary column torque within the frequency at which the driver steers.

The steering intervention determination unit 520 may determine whether the driver intervenes in steering, by monitoring the column torque noise-filtered by the filter unit 510. That is, the steering intervention determination unit 520 may determine that the driver intervenes in steering, when the state in which the magnitude of the noise-filtered column torque is equal to or more than the preset reference value is maintained for the preset reference time or more.

When determining that the driver intervenes in steering in the autonomous driving mode, the driver steering intervention determination unit 500 may calculate a first weight corresponding to the column torque. At this time, the driver steering intervention determination unit 500 may previously store a column torque weight table in which a weight is matched with each column torque. Therefore, the driver steering intervention determination unit 500 may extract a weight, corresponding to the column torque detected by the column torque sensor 100 or the column torque filtered by the filter unit 510, as the first weight.

The steering angular velocity weight calculation unit 600 calculates a second weight corresponding to the steering angular velocity detected by the steering angle sensor. At this time, the steering angular velocity weight calculation unit 600 may previously store a steering angular velocity weight table in which a weight is matched with each steering angular velocity. Therefore, when the steering angular velocity is detected by the steering angle sensor, the steering angular velocity weight calculation unit 600 may extract a weight, corresponding to the steering angular velocity detected from the steering angular velocity weight table, as the second weight.

When the determination result of the driver steering intervention determination unit 500 indicates that the driver intervenes in steering in the autonomous driving mode, the output of the autonomous driving needs to be reduced, and the MDPS motor needs to be controlled by an output according to the driver's intention. For this operation, the output control unit 700 adjusts the magnitude of the final output through a weight filter, i.e. exponential smoothing filter.

That is, the output control unit 700 may adjust the magnitude of the final output using Equation 1 below.

$$C = AK + (1-K)B \qquad \text{[Equation 1]}$$

In Equation 1, C may represent the final output, K may represent the final weight, A may represent the output of the MDPS logic unit (i.e. the amount of command current generated when the driver performs steering (first command current)), and B may represent the amount of command current generated during autonomous driving (second command current). The range of the final weight K may range from 0 to 1. When the final weight K is 1, the value of (1−K)B becomes 0, and the final output C is adjusted by the output A.

According to Equation 1, when the driver intervenes in steering in the autonomous driving mode of the vehicle, the output control unit 700 can reduce the output of the autonomous driving by adjusting the final weight K, such that steering is performed according to the driver's intention. At this time, the output control unit 700 may calculate the final weight by multiplying the first weight K1 corresponding to the column torque by the second weight K2 corresponding to the steering angular velocity.

The output control unit 700 includes a weight determination unit 710 and a final output determination unit 720.

The weight determination unit 710 determines the final weight by multiplying the first weight corresponding to the column torque detected by the column torque sensor 100 by the second weight corresponding to the steering angular velocity. That is, when the driver holds the steering wheel to perform steering during the autonomous driving of the vehicle, the vehicle needs to be continuously driven so that the autonomous driving mode and the manual driving mode are complementary to each other while a command for completely turning off the autonomous driving is not applied to the autonomous driving system unit 410. Therefore, the weight determination unit 710 may determine the final weight using the first weight corresponding to the column torque and the second weight corresponding to the steering angular velocity.

Basically, the driver hardly holds the steering wheel during autonomous driving. Therefore, the column torque converges to almost '0'. That is, as long as only the MDPS motor is operated during autonomous driving, steering can be performed, and torsion of the torsion bar hardly occurs because the driver does not hold the steering wheel. Therefore, the column torque may be almost '0'. However, the steering wheel may minutely vibrate while the autonomous driving is normally performed. Therefore, when an offset is equal to or less than a predetermined value, it is determined that the autonomous driving is normally performed, and the first weight K1 is determined so that the output of the autonomous driving becomes 100%. The first weight has a predetermined offset (a) as illustrated in FIG. 3A, and increases as the magnitude of the column torque increases.

When a rapid yaw or lateral acceleration occurs while the driver does not hold the steering wheel during autonomous driving, the driver feels a significant sense of difference. Therefore, the steering angular velocity during autonomous driving is not so high. In this case, the second weight K2 is set so that the weight during autonomous driving is applied as 100% within a predetermined steering angular velocity. However, when the driver suddenly wants to steer the vehicle, the second weight K2 is raised to make the final weight (K1*K2) converge to '1', in order to turn off the autonomous driving. Such a second weight has a predetermined offset (b) as illustrated in FIG. 3B, and the value of the second weight increases according to the steering angular velocity.

When the driver intervenes in steering during autonomous driving of the vehicle, the torsion bar is distorted to cause column torque. When the magnitude of the column torque is increased, the driver feels a significant sense of difference. That is, the driver feels that the vehicle is not steered according to the driver's intention, while feeling a large force in the hand of the driver. In order to remove the inconvenience of the driver, the weight determination unit 710 acquires the first weight corresponding to the magnitude of the current column torque from the column torque weight table and the second weight corresponding to the current steering angular velocity from the steering angular velocity weight table, and determines the final weight by multiplying the first and second weights.

The final output determination unit 720 may adjust a final output by applying the final weight to Equation 1, when the final weight is determined by the weight determination unit 710.

The final output determination unit 720 may adjust the output of the autonomous driving and the output generated by the driver's steering by applying the product of the first weight acquired from the column torque weight table and the second weight acquired from the steering angular velocity weight table. That is, the final output determination unit 720 may adjust the final command current by applying the final weight to the first command current and applying a value, obtained by subtracting the final weight from '1', to the second command current.

When the driver stops steering intervention, the column torque converges to around '0'. In this case, the output control unit 700 determines that the driver does not perform steering, and continuously maintains the autonomous driving by adjusting the first weight again.

When the column torque retains a predetermined magnitude or more for a predetermined time or more while the driver is intervening in steering in the autonomous driving mode, the output control unit 700 completely turns off the autonomous driving. This operation may be performed separately from the driver's steering intervention. That is, the output control unit 700 recognizes the driver's steering intervention at first, and momentarily adjusts the final output according to the weight. However, when the autonomous driving and the driver's steering intervention are continuously different from each other, the driver needs to continuously steer the vehicle while feeling a weight equal to or more than a predetermined value. This situation may cause a sense of difference during steering. Therefore, the autonomous driving needs to be completely turned off.

Since the autonomous driving and the driving by the driver's steering are not so different from each other when there is nothing significant, the autonomous driving and the driving by the driver's steering generally have a small difference in output therebetween. However, according to an error of the autonomous driving system or the driver's tendency, the autonomous driving and the driving by the driver's steering may have a large difference in output therebetween. When such a situation lasts, all steering authorities may be given to the driver such that the vehicle can be controlled according to the driver's intention.

The output control unit 700 may apply the weight (second weight) according to the steering angular velocity. If necessary, the output control unit 700 may vary the steering mode turn-off speed, such that the turn-off operation according to the driver's steering intention can be more actively implemented.

The electric steering apparatus configured in the above-described manner may optimize the steering control authority of the vehicle according to a situation during the autonomous driving of the vehicle, thereby helping the driver to drive the vehicle more conveniently and more safely. That is, when the driver's steering intervention is needed in the autonomous driving mode of the vehicle, the steering authority may be given to the driver. When the driver releases the steering wheel, the autonomous driving may be maintained again.

Figure 4:
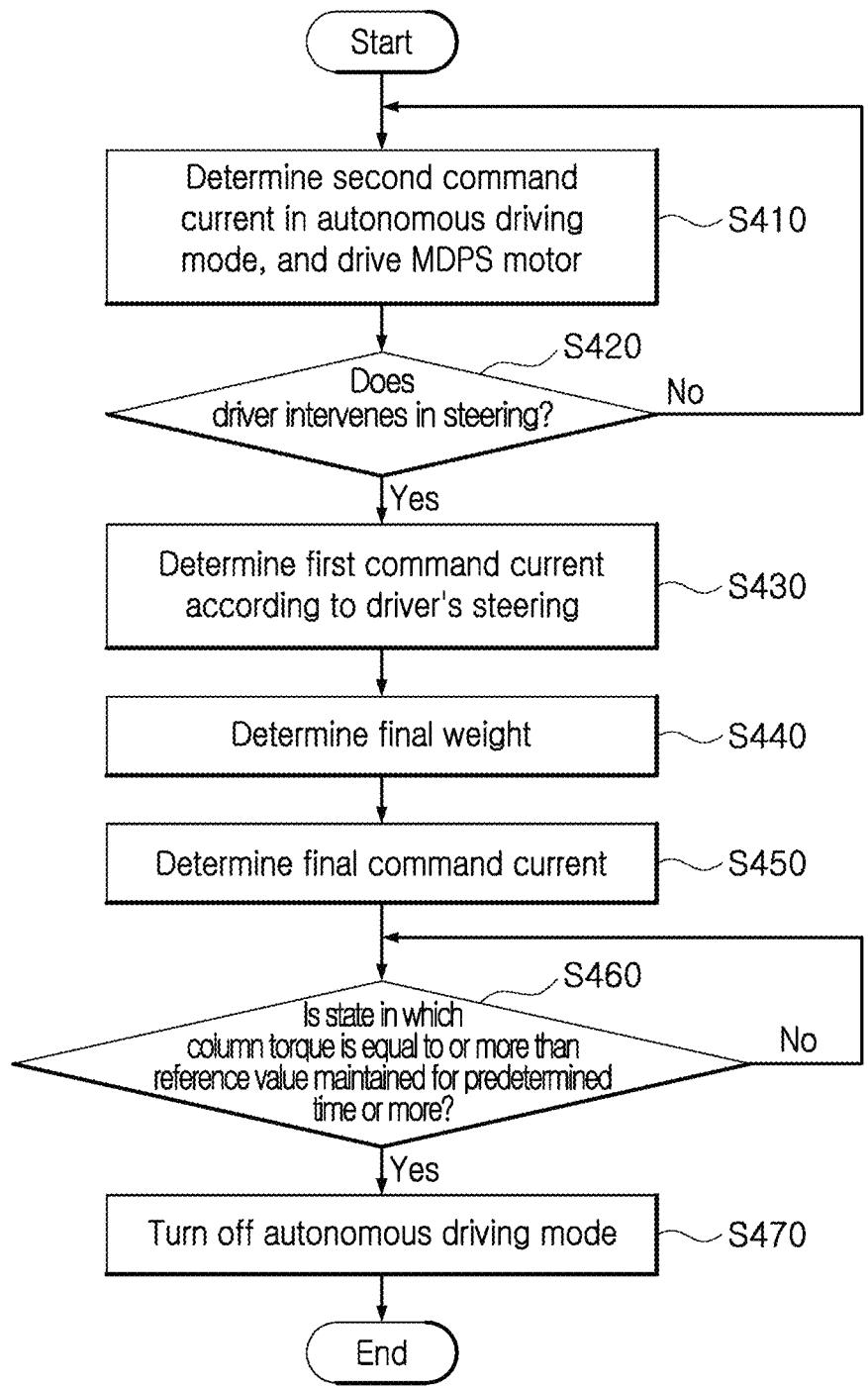
FIG. 4 is a flowchart for describing a method for controlling an electric steering apparatus in accordance with an embodiment of the present disclosure.

FIG. 4 is a flowchart for describing a method for controlling an electric steering apparatus in accordance with an embodiment of the present disclosure.

Referring to FIG. 4, the autonomous driving control unit 400 determines the second command current for driving the MDPS motor in the autonomous driving mode of the vehicle, and drives (controls) the MDPS motor, in step S410.

While step S410 is performed, the driver steering intervention determination unit 500 determines whether the driver intervenes in steering, based on the column torque detected by the column torque sensor 100, in step S420. At this time, the driver steering intervention determination unit 500 performs noise filtering on the column torque, detected by the column torque sensor 100, through LPF. When the state in which the magnitude of the noise-filtered column torque is equal to or more than the preset reference value is maintained for the preset reference time or more, the driver steering intervention determination unit 500 may determine that the driver intervenes in steering.

When the determination result of step S420 indicates that the driver intervenes in steering, the MDPS logic unit 300 determines the first command current by the driver's steering, based on the column torque applied to the steering column of the vehicle and the vehicle speed of the vehicle, in step S430.

When step S430 is performed, the output control unit 700 determines the final weight using the first weight corresponding to the column torque detected by the column torque sensor 100 and the second weight corresponding to the steering angular velocity, in step S440. That is, when the driver holds the steering wheel to perform steering during the autonomous driving of the vehicle, the vehicle needs to be continuously driven so that the autonomous driving mode and the manual driving mode are complementary to each other while a command for completely turning off the autonomous driving is not applied to the autonomous driving system unit 410. Therefore, the output control unit 700 may determine the final weight using the first weight corresponding to the column torque and the second weight corresponding to the steering angular velocity. At this time, the final weight may be calculated as the product of the first and second weights.

When step S440 is performed, the output control unit 700 determines the final command current by applying the final weight to the first and second command currents, in step S450. At this time, the output control unit 700 may determine the final command current using Equation 1 below.

When the column torque retains a predetermined magnitude or more for a predetermined time or more in step S460 while the driver intervenes in steering in the autonomous driving mode of the vehicle, the output control unit 700 completely turns off the autonomous driving mode in step S470.

Through the above-described process, the driver may hold the steering wheel to perform steering during the autonomous driving, without applying a command for completely turning off the autonomous driving mode in the autonomous driving mode of the vehicle.

As described above, the electric steering apparatus for a vehicle and the method for controlling the same in accordance with the embodiment of the present disclosure may accurately detect the case in which a driver rapidly turns off the autonomous driving mode of the vehicle and drives the vehicle in person because the driver does not momentarily want autonomous driving in the autonomous driving mode, or the case in which the driver's steering intervention is required for avoiding an obstacle due to a momentary error of the autonomous driving system. In this case, the electric steering apparatus and the method may give the steering authority to the driver, and then maintain the autonomous driving again when the driver releases the steering wheel. Therefore, the autonomous driving mode may smoothly transition depending on a situation, which makes it possible to maximize the convenience and safety of the driver.

When the driver performs steering while the autonomous driving mode is continuously turned on, the electric steering apparatus for a vehicle and the method for controlling the same may restrict the output of the autonomous driving, in order to turn off the autonomous driving while the driver performs steering, and to automatically maintain the autonomous driving when the driver does not hold the steering wheel again. Therefore, the electric steering apparatus and the method can raise the convenience of the driver, and compensate for a driver's carelessness or an error of the autonomous driving, thereby increasing the stability.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electric steering apparatus for a vehicle, comprising:
    a column torque sensor configured to detect column torque applied to a steering column of a vehicle;
    a vehicle speed sensor configured to detect vehicle speed of the vehicle;
    an autonomous driving control unit configured to determine a second command current for driving an MDPS (Motor Driven Power Steering) motor in an autonomous driving mode of the vehicle;
    a driver steering intervention determination unit configured to determine whether a driver intervenes in steering, by monitoring column torque of the column torque sensor, in the autonomous driving mode of the vehicle;
    an MDPS logic unit configured to determine a first command current based on the column torque and the vehicle speed which are detected by the column torque sensor and the vehicle speed sensor, respectively, when the driver's steering intervention occurs in the autonomous driving mode of the vehicle; and
    an output control unit configured to determine a final weight based on a steering angular velocity and the column torque detected by the column torque sensor, when the driver's steering intervention occurs in the autonomous driving mode of the vehicle, and determine a final command current by applying the determined final weight to the first and second command currents.

2. The electric steering apparatus of claim 1, wherein the driver steering intervention determination unit determines that the driver intervenes in steering, when the state in which the magnitude of the column torque is equal to or more than a preset reference value is maintained for a preset reference time or more.

3. The electric steering apparatus of claim 2, wherein the driver steering intervention determination unit performs low pass filtering on the column torque, and then determines whether the driver intervenes in steering, based on the column torque subjected to the low pass filtering.

4. The electric steering apparatus of claim 1, wherein the output control unit adjusts the magnitude of the final command current through an exponential smoothing filter.

5. The electric steering apparatus of claim 1, wherein the output control unit comprises:
    a weight determination unit configured to determine the final weight by multiplying a first weight corresponding to the column torque by a second weight corresponding to the steering angular velocity; and
    a final output determination unit configured to determine the final command current by applying the final weight to the first command current and applying a value, obtained by subtracting the final weight from '1', to the second command current.

6. The electric steering apparatus of claim 5, wherein the weight determination unit acquires a first weight corresponding to the column torque from a column torque weight table in which a weight is matched with each column torque, and acquires a second weight corresponding to the steering angular velocity from a steering angular velocity weight table in which a weight is matched with each steering angular velocity.

7. The electric steering apparatus of claim 1, wherein after determining the final command current by applying the final weight to the first and second command currents, the output control unit turns off the autonomous driving mode when the state in which the magnitude of the column torque is equal to or more than the preset reference value is maintained for a preset reference time or more.

8. A method for controlling an electric steering apparatus for a vehicle, comprising:
    determining, by an autonomous driving control unit, a second command current for driving an MDPS motor in an autonomous driving mode of a vehicle, and driving the MDPS motor;
    determining, by a driver steering intervention determination unit, whether a driver intervenes in steering, by monitoring column torque applied to a steering column of the vehicle in the autonomous driving mode of the vehicle;
    determining, by an MDPS logic unit, a first command current based on the column torque and the vehicle speed of the vehicle, when the driver's steering intervention occurs in the autonomous driving mode of the vehicle; and
    determining, by an output control unit, a final weight based on the column torque and a steering angular velocity, when the driver's steering intervention occurs in the autonomous driving mode of the vehicle, and determining a final command current by applying the determined final weight to the first and second command currents.

9. The method of claim 8, wherein in the determining of whether the driver intervenes in steering, the driver steering intervention determination unit determines that the driver intervenes in steering, when the state in which the magnitude of the column torque is equal to or more than a preset reference value is maintained for a preset reference time or more.

10. The method of claim 9, wherein in the determining of whether the driver intervenes in steering, the driver steering intervention determination unit performs low pass filtering on the column torque, and then determines whether the driver intervenes in steering, based on the column torque subjected to low pass filtering.

11. The method of claim 8, wherein in the determining of the final command current, the output control unit adjusts the magnitude of the final command current through an exponential smoothing filter.

12. The method of claim 8, wherein the determining of the final command current comprises:

determining, by the output control unit, the final weight by multiplying a first weight corresponding to the column torque by a second weight corresponding to the steering angular velocity; and determining, by the output control unit, the final command current by applying the final weight to the first command current and applying a value, obtained by subtracting the final weight from '1', to the second command current.

13. The method of claim 12, wherein in the determining of the final weight, the output control unit acquires the first weight corresponding to the column torque from a column torque weight table in which a weight is matched with each column torque, and acquires the second weight corresponding to the steering angular velocity from a steering angular velocity weight table in which a weight is matched with each steering angular velocity.

14. The method of claim 8, further comprising turning off the autonomous driving mode when the state in which the magnitude of the column torque is equal to or more than the preset reference value is maintained for the preset reference time or more, after the determining of the final command current.

* * * * *